United States Patent Office 3,049,050
Patented Aug. 14, 1962

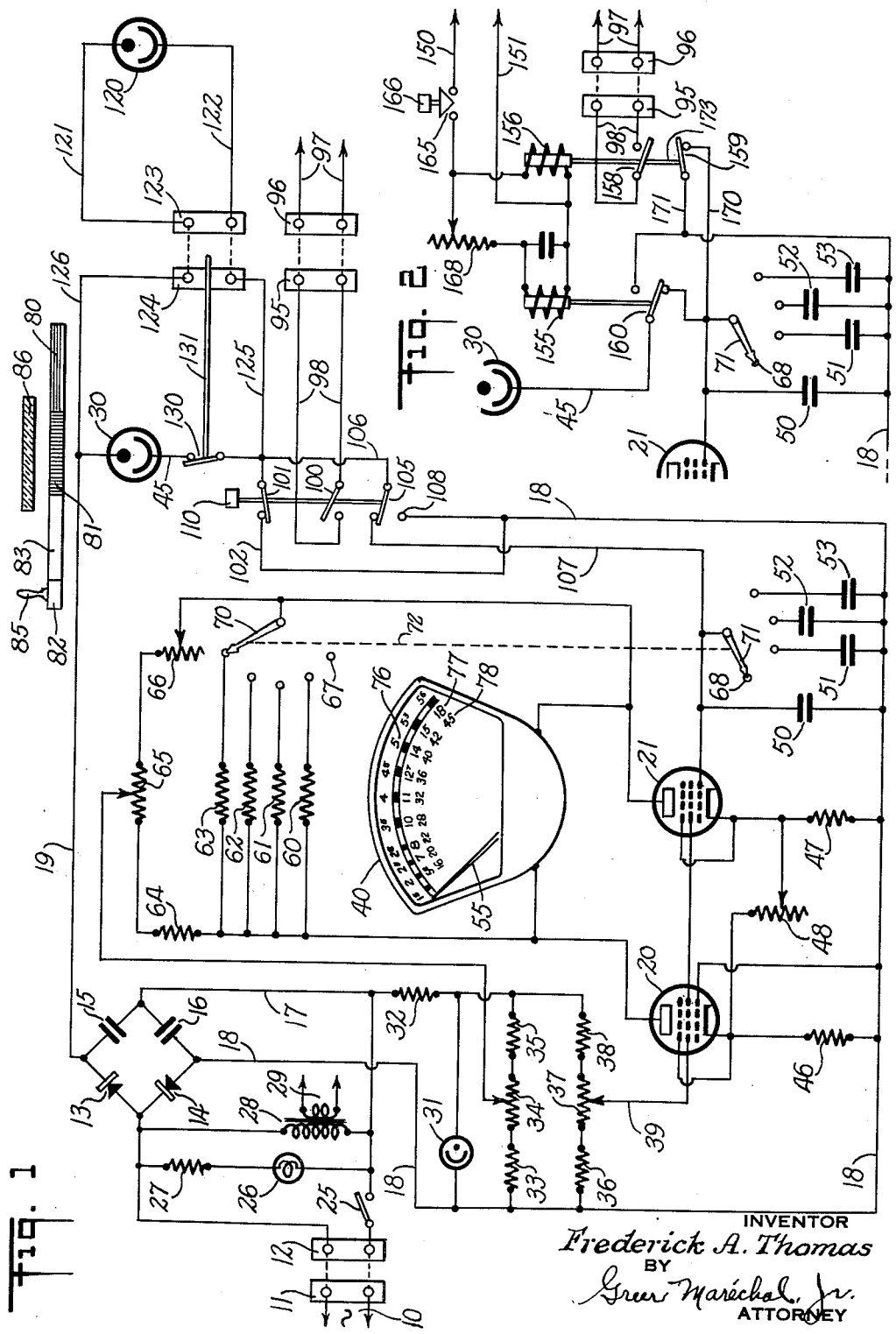

3,049,050
EXPOSURE METER FOR PHOTOGRAPHY
Frederick A. Thomas, 1118 1st Ave., New York, N.Y.
Filed Dec. 15, 1958, Ser. No. 780,438
16 Claims. (Cl. 88—23)

This invention relates to exposure meters for photography and, more particularly, to integrating light meters for measuring high speed light flashes and integrating such measurement and indicating the data measured in terms of photographic exposure data for a photographer about to photograph a scene illuminated by the light being measured.

With modern photographic techniques, and particularly in studio photography, it may be desired that all or part of the illumination for the photograph be provided by one or more high speed electronic flash units (conventionally known as "strobelights") which generate an extremely brilliant light flash of short duration (perhaps as short as $\frac{1}{5000}$ of a second). From the photographic standpoint, utilization of such lighting means is arranged in a situation where the photographic camera shutter is open for a fraction of a second considerably greater than the total duration of the light flash. Under such circumstances—and emphatically contrasted with the situation where the photographic lighting is provided by continuously illuminated floodlights—the total amount of light entering the camera lens and impinging upon the film during the exposure may be composed of a number of widely varying intensity components: e.g., the continuing ambient room lighting (which, perhaps, has an insignificant effect photographically on the light-sensitive emulsion of the film or plate in the camera) and the strobe flash, but such a strobe flash is of very short duration and includes a fairly low starting intensity, a peak intensity, and a fading intensity.

Because the total duration of the electronic flash is conventionally less than the total time that the camera shutter is open, accurate data for the appropriate setting or selection of the camera exposure as related, of course, to the particular light-sensitive emulsion speed of the film or plate, is needed for the total amount of light emitted by the flash, and not merely the intensity of its peak.

The utilization of such short duration electronic flash light sources may preclude completely accurate readings by conventional photo-electric cell exposure meters which record merely the static quantity of light to which they are exposed—if only because the electronic flash is of such short duration that such a conventional static exposure meter would fail to record the intensity of the light in a manner which could practicably be read or understood by the operator. Similarly, using high speed flashes, it is desired to have the exposure data from which the photographer will select the appropriate setting of his camera predicated, in addition to the peak intensity of his light flash, also on the total amount of light which may be expected to pass through his open shutter throughout the flash.

That is, in the absence of a measuring device which will integrate and record or indicate the total amount of light available for impinging on the photosensitive film or plate through the camera shutter, and disassociated from a function of time, it may be necessary for the photographer to rely either upon the assumption that the light source being used is consistent for a given set of circumstances or else to carry out preliminary photographic tests duplicating as much as practicable the actual conditions to be encountered. In the former case, the assumption of consistency may lead to substantial error in the final selection of the particular setting of the camera for the making of the photograph, and, in the latter case, time and money may be consumed through a duplication of effort, even resulting in taking several trial exposures and developing each one in order to decide upon the proper exposure and time selection for setting the camera shutter.

According to this invention, however, an instrument is provided whereby the total amount of light emitted from one or more such high speed flash lighting units and impinging on a photoelectric cell in the instrument is automatically integrated and indicated as a total sum so that, regardless of varying background and/or other situations, an instrument embodying and for practicing this invention will indicate the total amount of light, from such flash units or otherwise, which will illuminate the subject area to be photographed during the time the camera shutter is open, regardless of how conditions may vary from one exposure to the next, and, as a further feature of this invention, such integrated sum of light is indicated to be read directly in terms of camera exposure setting and directly related to the particular one of the widely varying light-sensitive emulsion film speeds which may be utilized by the photographer in any particular case.

One object of this invention is to provide a system for the photo-electric measurement of light from a source of high speed and short duration and for integrating such amount of light and indicating the total thereof in a manner directly translatable into exposure data for a photographic camera.

Another object of this invention is to provide a system of the character described, for integrating and measuring an amount of high speed flash and ambient light and indicating such integrated amount directly in terms of photographic camera exposure indicia.

A further object of this invention is to provide a system of the character described, for integrating and measuring the total amount of high speed flash and ambient light and indicating such integrated total directly in terms of photographic camera exposure indicia, such measurement and integrating and indicating being independent of time as a function in the measurement.

Still another object of this invention is to provide a system and apparatus of the character described for the electronic measurement and integration of a quantity of light and the indication of such measurement directly in terms of the particular photographic indicia intelligible to a photographer for selecting the particular exposure setting of his camera and also as directly related to the particular light-sensitive "film speed" of the particular emulsion and/or film or plate on which the photographer desires to make his photograph.

A still further object of this invention is to provide a system and apparatus of the character described for integrating the whole sum total of light illuminating the subject to be photographed and effective through the lens of a photographic camera within a predetermined finite small fraction of a second and to indicate the integrated total directly in terms of photographic exposure data and distinct from non-uniform variations in the mechanical operation of the device.

Other objects and advantages of this invention will be apparent from the following description, the accompanying drawing, and the appended claims.

In the drawing—

FIG. 1 is a diagrammatic or schematic indication of the electrical circuits and mechanical aspects of apparatus embodying and for practicing this invention; and FIG. 2 is a diagrammatic or schematic indication of the electrical circuits and mechanical aspects of a portion of the diagram of FIG. 1 and embodying a further modification of apparatus embodying and for practicing this invention.

Referring to the drawing, in which like characters of reference refer to like parts throughout the several views thereof, it may be convenient to trace through the diagrammatic representation of FIG. 1 generally at first from a main source of power 10 through the integrating bridge circuit including, among other components, vacuum tubes 20 and 21, the current flow or balance of which is modulated by the photo-electric activity of photocell 30, under the influence of the intervening circuitry, to be indicated at meter 40.

Thus, the apparatus of the embodiment illustrated in FIG. 1 is powered from a source of electric power 10, which may satisfactorily be the standard 110–120 v. alternating current leading to a plug 11 which interfits with a jack or receptacle 12 embodied in the apparatus and directs the power input through a rectifier-and-condenser circuit indicated by detectors 13 and 14 and condensers 15 and 16 to produce a rectified potential of approximately 150 volts between lines 17 and 18 (the latter of which may here be considered as of zero voltage potential or "ground" or "zero return" as is conventionally understood in this art) and a potential of approximately 300 volts between the lines 19 and 18. Preferably an off-on switch 25 is provided at the main power input and an off-on-indicating pilot light 26, including an appropriate voltage reducing resistance 27, may be provided at the main power input, as well as a transformer 28, for providing low secondary voltage (e.g., 6.3 v. A.C.) for the filaments of tubes 20 and 21 as through leads 29 (which, for clarity, are not drawn to tubes 20 and 21), across the alternating current input lines prior to the rectification of the input power.

As will become more apparent from a later portion of this description, the quantity of light to be measured impinges upon photocell 30 and is translated thereby into a modulating electric current which is stored (and/or integrated) by an integrating capacitor circuit to be described. The electric quantity stored by the integrating capacitors, being proportional to the integrated amount of light striking photo tube 30, is read and indicated by a high impedance electrometer circuit, including vacuum tubes 20 and 21, and is registered on meter 40 as later described.

The electrometer circuit including vacuum tubes 20 and 21 is primarily powered, as will be understood and as may be considered somewhat conventional with such circuits, by the rectified power through lines 17 and 18, as controlled and adjusted and modulated or regulated by tube 31 and resistor 32 to provide a satisfactory input voltage (e.g., about 105 v. D.C.) to the system, as well as the series of resistors 33, 34, 35, 36, 37, and 38 (which could be lumped into a fewer number of resistances in known manner, and of which 34 and 37 are preferably variable) with the output therefrom leading through line 39 to power tubes 20 and 21 (with variable resistors 34 and 37 for example, expressly provided for setting the plate and screen grid voltages of tubes 20 and 21). It should be noted that the foregoing intermediate power circuit 31—38, as well as resistors 46—48, is preferably provided as a means for adjusting and maintaining the electrometer bridge circuit relatively insensitive to changes of line voltage and/or aging or matching of tubes 20 and 21, which influences or differences might cause the electrometer circuit to respond in a non-linear manner, thus affecting the accuracy of the final data indication. By providing, as is preferred, the potentiometer bridges 32—35 and 36—38 and tube 31 adjustability is incorporated for the foregoing difficulties. Thus, by properly setting the variable resistances 34 and 37, inherent differences between tubes 20 and 21 are taken into account and/or balanced out, either initially, or, from time to time, so that a high degree of linearity of the indicating electrometer circuit is maintained throughout the life of the instrument, with variable resistor 48 being provided to control the sensitivity of the overall circuit particularly with regard to adjusting for differences in sensitivity among various photocells and/or other variable components.

As noted, the measurements of the electrometer circuit involving tubes 20 and 21 are impressed upon indicating meter 40, under the influence of other components later to be described. The modulations of voltage sensed by the electrometer circuit, as above noted, will now be described.

The quantity of light to be measured is allowed to impinge (by means hereinafter described) upon photocell 30, which, as will be understood, is a photo-emissive vacuum tube in which the amount of current flowing through the tube is modulated by or proportional to the amount of light striking the photo-sensitive surface of photocell 30, including, as will be understood, the conventional fact that a quantity of light impinging upon photo tube 30 causes a current flow in the photo tube circuit which varies as the intensity varies for the duration of a flash of light impinging thereon. Thus, such varying current engendered by photo tube 30, as passing through line 45 in the circuitry illustrated in FIG. 1, is accumulated or integrated or held in the appropriately selected one (as hereinafter described) of the capacitors 50—53, and this voltage, proportional to the total amount of light striking the photo tube, is held by the appropriate capacitors and measured by the electrometer circuit, including tubes 20 and 21, and the integrated value thereof indicated by meter 40 as hereinafter described.

As will be understood from the foregoing, the electrometer circuit described is so constructed as to measure whatever voltages are imposed thereon, with the results of such measurement being recorded or indicated by specific deflections of needle 55 of meter 40.

As will be noted from FIG. 1, the degree of deflection of needle 55, in response to the output of the electrometer circuit, is controlled, to one extent or another, by the specific one of the resistors 60—63, which may be selected by a switch indicated at 70—just as the particular output of the electrometer circuit may itself be predetermined or controlled by which particular one of the different capacitors 50—53 is selected to accumulate the output of photo tube 30 as provided by selector switch 71. As indicated by the dotted line 72, selector switch 70 and selector switch 71 are preferably mechanically interlocked whereby by the single setting of one control, an appropriate combination of integrating capacitors 50—53 and adjusting resistors 60—63 may be obtained to relate the output measurement of the electrometer circuit and the indication given by needle 55 of meter 40 to a particular "film speed" of light-sensitivity of a particular photosensitive emulsion or film or plate. Thus, as will be understood, a dial is provided on the disclosed apparatus whereby the particular setting or choice of a combination of one or more of the capacitors 50—53 and one or more of the resistances 60—63 (through the ganging or mechanical interlock of switches 70 and 71) may be selected to relate the indication on meter 40 and adjust the output of electrometer circuit to any one of a large plurality of presently established "film speed" numbers— which are, as well understood, merely arbitrary calibrations of the light-sensitivity of the different photo-sensitive emulsions under standard conditions. Preferably, with the arrangement shown, appropriate and well understood mechanical interlocks or "ganging" of switches 70 and 71 provide a selection of appropriate combinations of capacitors 50—53 and resistors 60—63 to provide more or less the full scale of film speeds (such as the "A.S.A." film speed scale) in which the operating of switches 70 and 71 is preferably calibrated in known manner. Regardless of such calibrations, however, this adjustment is merely a control or adjustment on the extent of deflection of needle 55 in meter 40 in response to the output of the electrometer circuit previously described, some adjustment of which is preferably provided by resistor 64 and variable or adjustable resistors 65 and 66. Preferably 65 and 66 are provided to balance the current flowing through tubes 20 and 21 to an equal value, with 66 as a gross adjustment internally set and 65 as a fine adjustment operable from outside the device as a "zero setting."

As a further convenience for the use of apparatus embodying this invention by photographers, it is preferred to have the settings or calibrations of meter 40 read directly in photographic terms, and yet incorporating sufficient flexibility and/or readability for convenient use. To this end, meter 40 is preferably calibrated directly in a range of lens aperture F/stops extending from F/1.5 (as found on high speed miniature cameras) to F/45 (as found on larger studio type professional cameras) or even F/64. Conventionally photographic camera lenses are calibrated in full stop openings (in the ratio of approximately two to one) using one or another of several overlapping F/ marking systems. Generally the smallest practical division realizable on a camera diaphragm ring is approximately one quarter stop, which is conventionally determined by interpolation. Accordingly, the dial of meter 40 is preferably calibrated in units no larger than one half stops, permitting easy fractional interpolation. Additionally, the majority of the popularly used F/ numbers of the various series are preferably indicated specifically on the scale.

Furthermore, since the complete range of F/ numbers from 1.5 to 45 may exceed a practically readable scale, this whole series, in the calibrations of meter 40, are preferably divided into several groups or scales, as illustrated by the several lines of indicia 76—78 in FIG. 1. In order to orient the deflections of needle 55 of meter 40 to any particular one of these three partial ranges or scales of the total measuring range of the meter, a plurality of optical filters 80 and 81 of varying intensities or densities are provided in a slide 82, or other arrangement, movably affixed between the light source to be measured and photocell 30 and including a handle 85, or other means, for selectively interposing either filter 80 or filter 81 or a filterless aperture 83 in slide 82 between the light source to be measured and photocell 30. By the appropriate selection of the varying densities of filters 80 and 81, the particular light to be measured by photocell 30 and the rest of the system, and eventually directly indicated in photographic terms on meter 40, may be controlled or predeterminedly adjusted to any particular one of the three consecutive ranges 76—78 of calibrations on the dial or scale of meter 40. Also, as will be understood, a diffusing disc 86 or the like is provided before photocell 30 for the measurement thereby of incident light impinging on the device.

It should also be noted that resistors 60—63 and capacitors 50—53 (as noted above and as specified below) are preferably selected and correlated to give a range of film speeds available all the way from an A.S.A. rating of 5 (the speed of slower color film emulsions) to a rating of 400 or more (faster than films currently available commercially). Also by appropriate calculation from the F/ number calibrations on the scale of meter 40 and/or manipulation of the film speed variables available by selecting of resistances 60—63 and capacitors 50—53, the range of lens openings and/or film speeds can be easily extended in either direction and still be readable directly in photographic terms.

More particularly with regard to the electrometer circuit illustrated, as will be understood, in a dormant state and when needle 55 reads zero, the amounts of current flowing through resistor 66, vacuum tube 21, and resistor 47 are of substantially the same magnitude as those flowing through resistor 64, vacuum tube 20, and resistor 46. This balanced condition is achieved by the appropriate adjustment or setting of variable resistors 65 and 66 and is generally indicated by the fact that the voltages at the points of connection of meter 40 with vacuum tube 20 and with vacuum tube 21 are substantially the same so that, accordingly, needle 55 of meter 40 does not move. When a positive voltage is applied to the control grid of tube 21, a flow of current is induced through tube 21, resistors 47—48, 66 and a portion of 65. This, in effect, lowers the potential at the juncture between meter 40 and tube 21, and, concurrently, flow of current through resistors 47—48 causes the grid of tube 20 to appear more negative with respect to ground or common return and to cause a decrease at 64 and a portion of 65. Such difference of potential between the two sides of meter 40, then, is indicated by deflection of needle 55 proportionate thereto.

As will be understood from the foregoing, then, the respective different resistors 60—63 are, in a manner of speaking, varied shunts placed across the leads to meter 40 for the purpose of desensitizing the meter to different fixed degrees, any one of which can be selected by switch 70, which also can select one position 67 having no extra resistance at all. Cooperating with this selection of any one (or none) of a plurality of different shunting resistances by switch 70 for effecting the selected range of reading of meter 40 according to predetermined fixed variations, are the selections of any (or none) of capacitors 51—53 for addition to capacitor 50 by selector switch 71, each of which capacitors produces a different reading at meter 40, and each such reading may be further varied, stepwise, by the appropriate addition to the circuit of one (or none) of shunting resistors 60—63.

Relating to the foregoing particularly to the preferred provision of a direct reading in "A.S.A." film speed numbers and as illustrative of the method of mechanically ganging selector switches 70 and 71, capacitors 50—53 are provided so that the ratio of the capacitance of each capacitor to the next highest capacitor is approximately 3.2–1 (e.g., 0.047, 0.15, 0.47, and 1.5 microfarads, respectively, for capacitors 50—53). Considering the photographic "A.S.A." film speed scale, it will be noted that the ratios between the film speeds designated by numbers 12, 40, 125, and 400 is approximately this same ratio. With such a situation, the setting of selector switch 71 to incorporate in the circuit capacitor 50 alone (at switch position 68) or additional capacitors selectively, while, at the same time, meter 40 is unshunted (as by having switch 70 in the position 67 thereof), will selectively produce a situation corresponding to any one of the aforementioned four A.S.A. settings. For a setting of the meter 40 to read directly with regard to a film speed intermediate the four above mentioned, one or another of resistances 60—63 is incorporated to alter in fixed increments the sensitivity of meter 40 for intermediate values other than those which would be read by the unshunted meter or any particular selection of capacitors 50—53. Thus, if the ratios between adjacent shunting resistances 60—63 are selected to alter the sensitivity or deflection resistance by a ratio of 1.25–1, the selective use of such resistances enables readings to fill in the gaps between the four capacitor settings in increments of film speeds of approximately the same ratio. For example, in such a situation and with the selection of a capacitor 50—53 to give a meter reading of, say, 200 micro amps. with switch 70 in position 67 thereof, i.e., with none of the resistors 60—63 in the circuit), operation of switch 70 to incorporate resistor 60 in the circuit alters the reading of meter 40 to 160 micro amps., selection 61 gives a reading of 125 micro amps., selection 62 gives a reading of 100 micro amps., selection 63 gives a reading of 83.3 micro amps., etc.—thus providing means for obtaining direct reading from the deflection of needle 55 of meter 40 in terms of various indicated film speed numbers according to which capacitors 50—53 is selected by switch 71 and which shunting resistance 60—63 is additionally selected by ganged switch 70 intermediate the various capacitor settings of switch 71.

As noted above, in addition to the aforementioned means for controlling the deflection of needle 55 of meter 40 in direct relation to the film speed or photosensitivity of the particular film to be used, the indicating scale of meter 40 is preferably calibrated directly in F/ numbers. Considering a design of indicating scale layout for light values of 512–1, the arcuate extent between adjacent F numbers has a ratio of 8 to 1. With such an arrangement, the filters 80—81, etc., are satisfactorily arranged to have a light absorption ratio of zero (for 83), ⅛ and ¹⁄₆₄ (for 81 and 80 respectively) and are preferably selected to maintain a constant light absorption in known manner, regardless of the photographic color value or color content of the light being transmitted therethrough.

Referring now to the right-hand part of the diagram of FIG. 1, a jack or receptacle 95 is indicated for receiving a cooperating plug 96 leading to whatever circuit will close and/or trip the flash lights or units to be measured. That is, leads 97 across the light source switch unit and leading to plug 96, when plugged into receptacle 95, are controlled, through leads 98 and switch 100, so that closing of switch 100 will close the light flash initiating circuit in known manner and/or trip or flash the source of light to be measured. Thus, an arrangement is provided for tripping or flashing the light source to be measured only when a measurement is to be made.

When a measuring device embodying this invention, as illustrated in FIG. 1, is in a position of rest and not indicating measurement of any light, the various controls and mechanical parts illustrated are in the positions shown in FIG. 1. For example, with switch 100 biased to the open position, the output line 45 of photocell 30 is connected directly to ground return 18 through switch 101 and line 102 so that, with switch 101 biased to the closed position, the electrical output of photo cell 30 (as might be engendered by ambient room light) is directly grounded and exercises no modulating or other effect on the electrometer circuit, meter 40, or the integrating capacitors 50—53. A third switch 105 is provided interconnecting the output of photocell 30 through lines 106 and 107 selectively either to the integrating capacitors 50—53 (through selector switch 71, etc.) or directly to ground return 18 through line 108, and switch 105 is normally biased toward the position shown connecting line 106 from photocell 30 to line 107 leading to the integrating capacitor through switch 71.

Preferably all three of switches 100, 101, and 105, are mechanically interlocked with a single operative mechanism, such as a push button indicated at 110 and the operative linkage extending therefrom, whereby switches 101, 100, and 105 are sequentially moved downwardly in the drawing upon depressing a push button 110—i.e., upon depressing of push button 110, switch 101 is first opened against the biased closed position thereof, then, upon further depressing push button 110, switch 100 is closed against the biased open position thereof, and, finally, switch 105 is moved from the position interconnecting lines 106 and 107 to the position interconnecting lines 106 and 108.

As will be apparent from the foregoing, then, the entire measuring apparatus (as plugged into a source of power 10 and as having the light source to be measured plugged into the apparatus at 95) is dormant with respect to ambient or other light which may impinge upon photo cell 30 since any electrical output of photocell 30 is directly grounded out to ground return 18 so long as switch 101 remains in its biased closed position. To take a reading or obtain a measurement, then, push button 110 is depressed. The first step of such action opens switch 101, thereby permitting the output of photocell 30 to have the modulating effect on the electrometer circuit through integrating capacitors 50—53. A fraction of time later, as push button 110 is further depressed, switch 100 is closed, thereby causing the strobe light or other source of light to flash or be energized through plug 95—96, etc., thus producing the source of light the intensity and quantity of which it is desired to measure. Upon further depressing push button 110, switch 105 is moved from the position shown in FIG. 1 (interconnecting line 106 from the output photocell 30, with line 107, leading to the integrating capacitors 50—53) to a position directly connecting line 106 from photocell 30, to line 108 and, thus, to ground return, once again grounding out and negating further indications of photo cell, etc. So long then, as push button 110 is held depressed (i.e., with switch 101 open, 100 closed, and 105 in the lower position thereof), needle 55 will remain at its greatest deflected position so that a reading will be held on meter 40.

As is apparent from the foregoing, photo cell 30 is normally responsive to ambient light in the room or any light impinging thereon, but the electrical output of this photo cell has no effect on the integrating capacitors so long as switch 101 is closed, grounding out photo cell 30. When push button 110 is depressed, opening switch 101, the output of photo cell 30, through line 45 and 106, switch 105, and line 107, leads directly to the integrating capacitors 50—53 to exercise the desired effect thereon for integrating of the light being measured. A fraction of a moment later, as push button 110 is further depressed, switch 100 is closed, thereby flashing the strobe or other flash light source the quantity of which it is desired to be measured, and, still a fraction of a moment later as push button 110 is further depressed, switch 105 is moved to a lower position, thereby grounding out the integrating capacitors and the electrometer so that the maximum deflection of needle 55 will be retained, there being nothing then in the circuit to cause return of needle 55 to a zero position.

Upon releasing push button 110, which is, as will be understood, biased upwardly in FIG. 1, all the switches 100, 101, 105 return to the position illustrated in FIG. 1, and, of course, the system returns to rest and needle 55 returns to its zero position with all the integrating condensers 50—53, etc., being grounded out to ground return 18 upon the closing of switch 101. As will also be apparent from the foregoing, the switching and indicating or measuring arrangements are operated and function in the same manner regardless of which of the filters 80 or 81 or the aperture 83 may be positioned between the light source being measured and photo cell 30, the varying functions of these filters being merely to select which of the several scales 76—78 will read the proper light measurement of F/opening upon deflection of needle 55 of meter 40.

It may also be desired by the photographer to measure directly the light which actually enters the camera shutter and impinges upon the film in the camera (as compared to taking a light measurement with photo cell 30 merely adjacent or near the camera) in order to get an absolute duplication of the actual light conditions to which the film will be exposed, and provision is made for such alternative measuring technique in the device embodying this invention. To this end, an auxiliary photo cell 120 is provided with mounting means (not shown, but of known and well-understood construction and design) for attaching photo cell 120 directly to the ground-glass viewing plate at the back of the camera or directly in or through the camera back in a position with the light-receiving portion of photo cell 120 more or less in the same plane within the camera as will be occupied by the photographic film or plate when the exposure is made and so that photo cell 120 receives, upon opening of the camera shutter and flashing of the lighting units, actually the same quantity and intensity and quality of light as will actually enter the camera lens and fall upon the photographic film during the exposure thereof—and automatically corrected for any light variations within the camera, the effect of the camera lens or light or color filters placed thereover, or other possible inaccuracies or variations from what- Also a variable resistance 168 is provided in the power circuit and effective upon relay 155 whereby (all in known and well understood manner) a specific time delay is arranged, according to the setting of resistor 168, between the operating of relay 156 and the operation of relay 155, after closing the relay power circuit by depressing push-button 166 and closing power switch 165, and such time delay is adjustable and predetermined to a specific time (as by the setting of resistor 168, or otherwise as by selecting different types of relays with inherent different response times) whereby relay 155 will be activated to move switch 160 at a specific time interval (e.g., 1/50 second) after relay 156 has been activated to move switches 158 and 159—and notwithstanding or independently of the manual speed with which push-button 166 was pushed to close power switch 165.

Thus, closing switch 165, by depressing push-button 166, energizes or activates relay 156 to open switch 159, thereby disconnecting the output of photocell 30 and integrating capacitors 50—53 from ground return 18 (through lines 170 and 171). Sequentially (as a result of the mechanical interlock linkage indicated at 173), energizing of relay 156 then closes switch 158, thereby energizing or flashing the lighting unit, the extra illumination of which it is desired to include in the final integrated measurement or reading, through lines 98, jack 95, and plug 96 connecting the leads 97 of the lighting unit into the trip circuit. When relay 156 opens switch 159, the breaking of the leads to the zero return 18 permits photo cell 30, and the measuring output thereof, to be integrated as a total quantity of integrating capacitors 50—53, and the subsequent flashing of a remote light unit (by closing switch 158) adds this added amount of light to that being noted and integrated by photo cell 30 and capacitors 50—53 for transmittal (as hereinbefore described) to the electrometer circuit of tubes 20 and 21 and the indicating means or circuits involving meter 40, etc.

Thereafter, relay 155 operates to move switch 160 from the lower position in FIG. 2 interconnecting output 45 of photo cell 30 to the integrating capacitors 50—53 (through selector switch 71) to the upper position in the diagram interconnecting output 45 of photo cell 30 directly to the ground or zero return 18, thereby maintaining needle 55 of meter 40 in its position of greatest deflection for the reading thereof against the appropriate one of scales 76—78 by the operator. Since combination of relays 155 and 156 (as a mechanism well understood in this art and, actually commercially available including an adjustable time delay), include a variable time delay between the activation of relay 156 and 155, as adjustable by variable resistor 168, the resulting measurements read directly in terms of the photographic indicia of the total light measured during a finite and specific period of time.

Thus, if resistor 168 is set so that (regardless of how fast or slowly push-button 166 is depressed) relay 156 first opens switch 159 (thereby readying the device to make a measurement) and then flashes the strobe light unit by closing switch 158, and if the adjustment 168 is set so that relay 155 will be energized or activated to move switch 160 toward the upward position in the drawing 1/50 second after relay 156 opens switch 159, then the reading indicated on the scale of meter 40 will be the total quantity of light impinging upon photo cell 30 during the 1/50 second time interval between the operation of relays 156 and 155. As will be understood, reading an F/opening value from meter 40 with the knowledge that it was directly related to a 1/50 second time interval, permits the direct interpolation of an appropriate F/-stop-shutter-speed relationship for that particular exposure.

Naturally, the particular time interval between the operation of relays 155 and 156 can be adjusted to any particular value, but, whether it be 1/25 second or 1/100 second, it still indicates to the photographer, in terms of the F/opening readings of meter 40, the proper exposure to be made. Similarly (and as compared to the mechanical switch arrangement 110, etc., of FIG. 1, with which non-uniform readings could be obtained depending upon the speed with which button 110 was depressed in instances where the ambient light was a significant factor in the total illumination), the arrangement of FIG. 2 eliminates operational variations and integrates the total amount of light within a specified time interval, should such indicia be desired. Also the system of FIG. 2 is applicable to the measurement of continued lighting even when no flash is used, or to the combination of flood lighting and flash lighting.

It could, also, desirably be noted here—merely as a means of completing the disclosure here of illustrative embodiments of a device according to this invention and, of course, without limiting the various arrangements and elements of the foregoing—that satisfactory results have been achieved in the various modifications and embodiments and circuitry hereinbefore recited by the use of the following well-known components for the following elements of a device as disclosed and embodying and for practicing this invention, although, as will be understood, the particular elements recited in the following table are merely for illustrative purposes and not to be considered limiting on the construction of a device for embodying and practicing this invention:

| Numeral | Item | Rating |
| --- | --- | --- |
| 27 | Ballast for neon bulb 26 | 56,000 ohms. |
| 28 | Transformer | 110 volts to 6.3 volts A.C. |
| 13, 14 | Selenium rectifiers | 20 milliamperes, 135 volts. |
| 15 | Electrolytic capacitors | 4 mfd., 150 volts. |
| 16 | ----do---- | 10 mfd., 150 volts. |
| 32 | Resistor | 27,000 ohms, 1 watt. |
| 31 | Voltage regulator tube | OB2. |
| 33 | Resistor | 27,000 ohms. |
| 34 | Potentiometer | 25,000 ohms. |
| 35 | Resistor | 27,0000 ohms. |
| 36 | ----do---- | 33,000 ohms. |
| 37 | Potentiometer | 25,000 ohms. |
| 38 | Resistor | 4,700 ohms. |
| 64 | ----do---- | 4,700 ohms. |
| 65 | Potentiometer | 2,000 ohms. |
| 66 | ----do---- | 10,000 ohms. |
| 60 | Resistor | 2,200 ohms. |
| 61 | ----do---- | 820 ohms. |
| 62 | ----do---- | 430 ohms. |
| 63 | ----do---- | 300 ohms. |
| 46, 47 | ----do---- | 1,000 ohms. |
| 48 | Potentiomenter | 2,000 ohms. |
| 20, 21 | Vacuum tubes | 5,654. |
| 50 | Capacitor | .047 mfd. |
| 51 | ----do---- | .10 mfd. |
| 52 | ----do---- | .42 mfd. |
| 53 | ----do---- | 1.42 mfd. |

While the methods and forms of apparatus herein described constitute a preferred embodiment of the invention, it is to be understood that the invention is not limited to these precise methods or forms of apparatus, and that changes may be made therein without departing from the scope of the invention which is defined in the appended claims.

What is claimed is:

1. In an integrating photographic exposure meter device for measuring the quantity of light produced by a light flash and for indicating such measurements directly in terms of photographic exposure data individually applicable to photographic films of different light sensitivity values, the combination which comprises a photocell for producing a modulated electric current proportional to the quantity of said light impinging thereon, an integrating circuit operatively connected to said photocell and including a plurality of different integrating condensers for integrating said modulated electric current from said photocell for producing different electric potentials on said condensers proportional to different quantities of light impinging on said photocell, each of said condensers having a different capacitance value representing a different one of said different light sensiever source as might arise between the actual light impinging in the film inside the camera and a measurement taken by photo cell 30 outside the camera itself.

The electrical output of photo cell 120 is led, by lines 121 and 122 of any convenient length for the appropriate or desired remote positioning of photo cell 120, to plug 123 for connecting photo cell 120 into the measuring and indicating and integrating circuits of the device. Plug 123 connects into a jack or receptacle 124, through which lines 121 and 122 from photo cell 120 are connected into the photoelectric circuit between high voltage line 19 and switch 101 by, as illustrated, lines 125 and 126. Also, a switch 130 is provided for opening output line 45 from photo cell 30 and disconnecting the output of that photo cell from the circuit ahead of switch 101, and this switch 130 is preferably such that it will be held in open position (in known manner, as diagrammatically illustrated by push-rod 131) whenever the auxiliary photo cell 120 plug 123 is plugged into jack 124, so that, whenever the auxiliary photo cell remote measuring arrangement 120 (frequently called a "camera probe") is used as the source of electrical signal from which the light measurement is to be made, any output from photocell 30 is disconnected from the integrating and indicating circuits so as to have no indicated effect thereon.

As will also be understood, and particularly with photographing close-up work (such as small articles or the interior of constricted spaces or even for close-up reading for highlights close to the subject), it may also be convenient to have an auxiliary phototube such as 120, separately mounted in a small container and even including optical filters 80—83, for greater ease in handling and manipulation close to the subject or in small spaces or close-up work, and such an arrangement, as will be understood, is comprehended within a device according to the present invention, just as with auxiliary photocell 120 mounted for affixing to the plate back of a camera, and with the appropriate lead wires and switches for connection to the device, although the latter may be remote from the subject through jack 124.

As also will be understood, the use of an auxiliary phototube such as 120 contemplates the deactivation of phototube 30, which may satisfactorily be effected by a push switch in jack 124 (such as 130), an additional selector switch mounted on the device or on the remote phototube 120 part thereof, or merely blinding phototube 30 as by interposing of opaque material across the light sensitive surface thereof.

As will be understood from the foregoing, the various elements and electrical and mechanical circuits and constructions above described are preferably mounted for convenience as enclosed in a box or case of convenient size for handling by the photographer, and including in the outer walls and/or accessible from the outside thereof jacks 12, 95, and 124 for receiving the respective power, strobe trip, and probe plugs 11, 96, and 123; as well as light-admitting aperture for photocell 30 (with filters 80 and 81 and diffuser 86, etc., mounted thereat), operating means 85 for selecting among such filters, operating means for selector switches 70 and 71, push-button 110, off-on switch 25, pilot light 26, and meter 40, with, preferably, some operating means for adjusting the various potentiometers 66, etc., for balancing tubes 20 and 21 and maintaining an accurate adjustment or zero setting for meter 40, etc. The illustrative circuitry of FIG. 1 is particularly designed for conveniently compact arrangement in a relatively small box or case for ready handling by the photographer in his studio or elsewhere. As is also apparent, particularly for use outside a studio, a power source for this device may readily be provided other than the 110-120 v. A.C. power 10 and including portable sources of comparable power, as well as a battery-powered D.C. power pack (with or without an inverter), with no more than certain conventional reorganizations of the power circuit at the left side of FIG. 1 and/or the provision of additional auxiliary power-imput wiring jacks— all as well known in this art and as well understood by men skilled therein upon disclosure of the foregoing illustrative embodiment of a device embodying and for practicing this invention.

Review of the foregoing description of one illustrative embodiment of a device according to this invention indicates that time has been more or less removed as a function of the light measurements and indications involved. That is, the device integrates the total quantity of light, of whatever quality or intensity, which impinges upon either photo cell 30 or auxiliary photo cell 120 between the time that switch 101 is opened and the time that switch 105 is moved from line 107 to line 108. In studio and like work utilizing high-speed, high-intensity flashes of a duration substantially shorter than the length of time the camera shutter is open and of an intensity tremendously greater than the otherwise ambient studio lighting, particular variations of time may not be of any crucial significance in the final exposure data, because, for example, the normal ambient lighting in a studio of a scene to be photographed by usual incandescent lights may frequently or conventionally be of such low intensity (relative to the photographic film photo-sensitivity and/or the high-intensity electronic flash source of light being measured and used during the exposure) as to have virtually no photographic effect on the film in the camera during the exposure. In such cases, as will be understood, the contribution of any ambient low-intensity lighting to the overall integrated total quantity of high-speed flash lighting (particularly with a slow speed studio-type photographic film or a low studio-type camera setting) may, indeed, be of little significance photographically, with little photographic significance being discernible as between readings or measurements obtained on a device as illustrated in FIG. 1 when push-button 110 is operated rapidly and when it is operated slowly.

It may be desired, however, to utilize an exposure meter device embodying and for practicing this invention under other or non-studio type photographic situations. For example, it may be desired to photograph a scene out of doors in bright sunlight and to use a high-speed or high-intensity flash unit in addition to the sunlight for filling out shadows or obtaining some other particular effect under circumstances where the continuing ambient lighting, apart from the superimposed flash, contributes an important element or portion of the total light effecting the photosensitive emulsion on the film during exposure.

In such cases, the factor of time in the integrating of the total quantity of light available for the exposure or impinging upon the film may become a significant consideration in the proper choice of shutter F/stop setting of the camera, and provision for such a situation is also made in accordance with the present invention, one embodiment of such modification being illustratively indicated in the partial diagram of FIG. 2.

Referring to FIG. 2, which is a modification of only a portion of the illustration for FIG. 1, similar integrating capacitors 50—53 are shown as connected through a selector switch 71 to vacuum tube 21, and, as will be understood, the rest of the integrating, measuring, and indicating circuits of FIG. 1. Also photo cell 30 is shown (into the circuit of which may be connected auxiliary photo cell 120, as will be understood) with its output line 45, and a power circuit input is indicated at lines 150 and 151 (to ground). Two relays are indicated at 155 and 156 for operating a plurality of switches 158—160 upon the energizing of relays 155 and 156, all the switches 158—160 being biased into the positions illustrated in FIG. 2 when relays 155 and 156 are de-energized. A power switch 165, operated by a push-button 166 or equivalent means, is provided in the main power circuit 150—151 for energizing relays 155, 156.

tivity values of said photographic films whereby said potentials produced on said different condensers are different for the same quantity of light impinging on said photocell and are directly related to different ones of said photographic film light sensitivity values, a high input impedance vacuum tube electrometer circuit operatively connected to said integrating circuit for measuring said different electric potentials on said condensers after an integration thereby, meter means in said electrometer circuit and calibrated in terms of said photographic exposure data for visibly indicating measurements by said electrometer circuit of said potentials on said condensers, and means for selectively and individually connecting each of said different condensers into said integrating circuit for producing selectively different electric potentials thereon for the same quantity of light to indicate said photographic exposure data selectively differently for each of said different photographic film light sensitivity values.

2. An integrating photographic exposure meter device as recited in claim 1 which also includes a plurality of different resistances for said electrometer circuit, each of said different resistances having a different resistivity value representing different ones of said different light sensitivity values of said photographic films, and means for connecting said resistances selectively and individually into said electrometer circuit and operative on said meter means therein for altering said indicated measurements of said meter means selectively to a plurality of different indicated measurements for each said electric potential on said integrating circuit measured by said electrometer circuit to indicate said photographic exposure data differently for different ones of said photographic films.

3. An integrating photographic exposure meter device as recited in claim 2 which also includes operating control means for connecting different ones of said resistances into said electrometer circuit and simultaneously different ones of said condensers into said integrating circuit for providing a plurality of different combinations of condensers and resistances to alter both the electric potential to be measured on said integrating circuit and the measurement thereof indicated by said meter means in said electrometer circuit for the same quantity of light impinging on said photocell to indicate said photographic exposure data selectively differently for different ones of said photographic films.

4. An integrating photographic exposure meter device as recited in claim 2 in which the different capacitances of said plurality of condensers are sequentially in ratios of 3.2 to 1 and in which said resistivities of said different resistances in said electrometer circuit sequentially and incrementally alter said indications of said meter means in ratios of 1.25 to 1.

5. An integrating photographic exposure meter device as recited in claim 1 in which said high input impedance vacuum tube electrometer circuit comprises a balanced bridge circuit subject to imbalance by said electric potentials on said integrating condenser means and in which said meter means is connected across said balanced bridge circuit to measure said imbalance and indicate said measurements thereof as said photographic exposure data.

6. An integrating photographic exposure meter device as recited in claim 1 which also includes a plurality of light filters of different light transmission characteristics and means for selectively positioning said filters adjacent said photocell for altering and controlling the quantity of light impinging thereon from said light flash for extending the total measuring range of said exposure meter for different quantities of light to be integrated thereby.

7. An integrating photographic exposure meter device as recited in claim 1 which also includes first switch means for selectively connecting and disconnecting said photocell to ground, second switch means for instigating said light flash to be measured, third switch means for disconnecting said photocell from said integrating circuit after an integration thereby, and operating means for sequentially operating said three switch means in the order stated.

8. An integrating photographic exposure meter device as recited in claim 7 in which said operating means for sequentially operating said three switch means also includes electrical relay means having an automatic and predetermined time delay between said operation of said first switch means and said third switch means providing an integrated measurement of the total quantity of light impinging upon said photocell during said predetermined time delay for determination of said photographic exposure data as including the factor of time in addition to total quantity of light.

9. An integrating photographic exposure meter device as recited in claim 1 in which said photocell is separate from said exposure meter device and arranged for use remotely therefrom, and which also includes wiring leads for connecting said remote photocell into said integrating circuit in said exposure meter.

10. In an integrating photographic exposure meter device for measuring the quantity of light produced by a light flash and for indicating such measurements directly in terms of photographic exposure data individually applicable to photographic films of different light sensitivity values, the combination which comprises a photocell for producing a modulated electric current proportional to the quantity of light impinging thereon, an integrating circuit operatively connected to said photocell and including at least one integrating condenser for integrating said modulated electric current from said photocell producing different electric potentials on said condenser proportional to the quantity of light impinging on said photocell, a high input impedance vacuum tube electrometer circuit operatively connected to said integrating circuit for measuring said different electric potentials on said condenser after an integration thereby, meter means in said electrometer circuit and calibrated in terms of said photographic exposure data for visibly indicating measurements by said electrometer circuit of said different potentials on said condenser, a plurality of different resistances for connection individually to said meter means in said electrometer circuit, each of said resistances having a different resistivity value representing different ones of said different light sensitivity values of said photographic film for altering said visible indications of said meter means to a plurality of different exposure data readings for each said potential being measured by said electrometer circuit, and operating and control means on said device and accessible during use thereof for connecting each of said plurality of different resistances selectively and individually to said meter means in said electrometer circuit for determining which of said different readings will be indicated by said meter means for each of said different potentials measured by said electrometer circuit for each of said different quantities of light impinging upon said photocell.

11. An integrating photographic exposure meter device as recited in claim 10 which also includes additional variable resistor means for establishing and adjusting a zero setting for said meter means in said electrometer circuit separately and independently of said alterations of said deflection of said meter means effected by said plurality of different resistances.

12. An integrating photographic exposure meter device as recited in claim 10 in which said electrometer circuit includes a balanced bridge circuit subject to imbalance by said electric potentials on said integrating condenser, and in which said meter means is connected across said balanced bridge circuit for measuring and indicating the degree of said imbalance thereof caused by each said electric potential on said integrating condenser, and in which said plurality of different resistances are selectively and individually connected to said meter means for altering the proportion of said total imbalance of said electrometer circuit visibly indicated by said meter means.

13. An integrating photographic exposure meter device as recited in claim 10 in which said integrating circuit includes a plurality of integrating condensers and means for connecting said condensers selectively and individually into said integrating circuit for altering said electric potential thereon to be measured by said electrometer circuit for the same quantity of light impinging upon said photocell.

14. An integrated photographic exposure meter device as recited in claim 10 in which said meter means in said electrometer circuit comprises a milliammeter and in which said plurality of different resistances are connected in shunt parallel to said milliammeter by said operating and control means.

15. In an integrating photographic exposure meter device for measuring the quantity of light produced by a light flash and to indicate such measurements as photographic exposure data individually applicable to photographic films having a wide range of different emulsion speeds, the combination which comprises a photocell for producing a modulated electric current proportional to the quantity of said light impinging on said photocell, an integrating circuit operatively connected to said photocell and including a plurality of different condensers having different capacitances for integrating said modulated electric current from said photocell producing different electric potentials on said condensers, a balanced bridge vacuum tube electrometer circuit operatively connected to said integrating circuit for measuring said electric potentials on said condensers after an integration thereby, an indicating meter having an indicating dial and connected across said electrometer circuit for visibly indicating measurements by said electrometer circuit of said electric potentials on said condensers directly in terms of said photographic exposure data for various quantities of light impinging on said photocell, a plurality of different resistances for connection to said indicating meter in said electrometer circuit for selectively altering the deflections of said meter and said indications of said exposure data on said dial for each of said different electric potentials on said condensers being measured by said electrometer circuit, means for connecting each of said plurality of condensers selectively and individually into said integrating circuit for selectively altering said electric potentials produced thereon by each different quantity of light impinging on said photocell, means for selectively and individually connecting each of said plurality of resistances directly to said indicating meter in said electrometer circuit for selectively controlling said alterations of said indicated measurements on said dial, and operating means on said exposure meter device and accessible during use thereof for connecting a different combination of said plurality of resistances and said plurality of condensers respectively to said indicating meter and said integrating circuit for each of said different emulsion speeds of said photographic films whereby said photographic exposure data indicated on said meter dial relates directly to a particular selected one of said photographic film emulsion speeds for various quantities of light impinging on said photocell and depending upon which combination of said resistances and said condensers be selected by said operating means.

16. An integrating photographic exposure meter device as recited in claim 15 in which said different capacitances of said plurality of different condensers increase sequentially by a ratio of 3.2 to 1 for controlling said photographic exposure data indicated by said meter for a given quantity of light to different ones of said photographic film emulsion speeds spaced through said wide range of said different film emulsion speeds, and in which said alterations in said deflection of said indicating meter effected by said plurality of different resistances increase sequentially in the ratio of 1.25 to 1 for controlling said photographic exposure data indicated by said meter for the same quantity of light to different ones of said photographic film emulsion speeds spaced through said range of emulsion speeds between said ones thereof selected by said condensers.

References Cited in the file of this patent

UNITED STATES PATENTS

| | | |
|---|---|---|
| 2,360,082 | Stone | Oct. 10, 1944 |
| 2,588,368 | Edgerton | Mar. 11, 1952 |
| 2,633,784 | Cofield | Apr. 7, 1953 |